United States Patent [19]

Meyers

[11] Patent Number: 5,261,011
[45] Date of Patent: Nov. 9, 1993

[54] IMAGE DISCRIMINATOR WHICH AUTOMATICALLY ENHANCES THE ABILITY OF A SYSTEM TO DISCRIMINATE BETWEEN SOURCES THAT CAN NOT BE REMOVED BY FIXED SPECTRAL CANCELLATION

[75] Inventor: Franklin J. Meyers, Chatsworth, Calif.

[73] Assignee: Hughes Aircraft Company, Los Angeles, Calif.

[21] Appl. No.: 694,618

[22] Filed: May 2, 1991

[51] Int. Cl.$^5$ .............................................. G06K 9/38
[52] U.S. Cl. ......................................... 382/50; 382/1; 382/45; 358/125
[58] Field of Search .................. 382/1, 17, 48, 45, 50; 358/103, 105, 108, 109, 125, 126; 342/95, 96, 98, 381, 384, 192, 199–201

[56] References Cited

U.S. PATENT DOCUMENTS

| | | | |
|---|---|---|---|
| 3,562,423 | 2/1971 | Murphy | 382/45 |
| 3,727,219 | 4/1973 | Graham | 342/191 |
| 3,956,748 | 5/1976 | Rymes | 342/96 |
| 4,497,065 | 1/1985 | Tisdale et al. | 382/1 |
| 4,498,083 | 2/1985 | Gutleber | 342/383 |
| 4,739,401 | 4/1988 | Sacks et al. | 382/1 |
| 4,959,714 | 9/1990 | Lo et al. | 358/125 |

Primary Examiner—Jose L. Couso
Attorney, Agent, or Firm—C. D. Brown; R. M. Heald; W. K. Denson-Low

[57] ABSTRACT

An image discriminator which automatically enhances the ability of a system to discriminate between sources that can not be removed by fixed spectral cancellation. The invention (10) includes a mechanism (12, 14, 16, and 18) for separating input energy into first and second frequency bands and providing first and second signals corresponding thereto. The ratio of the amplitudes of the first and second signals are varied by variable gain amplifiers (20 and 22) and subtracted from each other by a subtractor 24 to provide a control signal. The control signal is used in a tracker circuit 24 to control the gain of the first and second signals. Third and fourth signals are extracted by dual on-track signal rejection (28 and 30) from the first and second signals which represent energy from non-tracked objects. Circuitry (34 and 36) is provided for varying the ratio of the amplitudes of the third signal and the fourth signal in at least two trials. The amplitude ratio varied third signal is subtracted from the amplitude ratio varied fourth signal for each respective trial by subtractors (38 and 40) to provide fifth and sixth signals respectively. The fifth and sixth signals are analyzed and used by level detection circuitry (42, 44, 46, 48, and 50) to adjust the ratio of the gain of the first and second signals in response thereto thereby enabling cancellation of unwanted signals in the subtractor 24.

24 Claims, 4 Drawing Sheets

IMAGE DISCRIMINATOR WHICH AUTOMATICALLY ENHANCES THE ABILITY OF A SYSTEM TO DISCRIMINATE BETWEEN SOURCES THAT CAN NOT BE REMOVED BY FIXED SPECTRAL CANCELLATION

BACKGROUND OF THE INVENTION

1. Field of the Invention

The present invention relates to image tracking systems. More specifically, the present invention relates to techniques for automatically balancing channels to reject unwanted signals received by two color image detection systems.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Optical tracking systems process energy in the visible or infrared spectrum and generate signals indicative of track quality, the extent to which a target or guidance system is accurately tracking a desired object, image, or location. These optical image discrimination systems distinguish between different classes of objects based on emissions and reflections in certain spectral bands from discrete sources. In the process of discerning wanted from unwanted objects, conventional image discriminators presume certain differences in the spectral energy distribution of the two sources.

For example, to track a target which is reflecting sunlight, a conventional image discriminator would be equipped with a detector and one or more lenses. A reticle, such as the wagon wheel reticle of FIG. 1, would be moved in a nutation motion in relation to the image from the lens. The centered circle represents a point source at the track null, where a received image produces a constant carrier signal by passing sequentially across equal width opaque and transparent areas of the reticle. The offset circle represents a source displaced from this track null.

Typically, image nutation moves the image so that all points move in equal, in-phase circles. As the image crosses wide and narrow parts of the spokes, it produces a frequency modulation of the carrier signal, output by the detector, into one or more discrete frequency bands. The range of the frequency excursion represents the radial distance from the track null and the phase of the modulation envelope gives the direction of the displacement. The chief signal in a scene can therefore be centered, based on the phase and amplitude of the modulation, by moving the lens by use of a gimbal or other customary means. This signal is input to a tracker circuit typically implemented for such reticles with a frequency modulation (FM) discriminator. The spectral difference between the two frequency bands for sunlight would be readily made virtually identical and could be canceled by subtraction. For the target, however, the spectral difference between the two bands would be different. A discrete signal would result from the subtraction and could be used to center the system on the target image.

While this system works well when the spectral energy distribution of radiation from the unwanted object is constant or predictable, this system has some difficulty with images having varying or unpredictable spectral energy distributions. Such is the case, for example, when sunlight is reflected or scattered from surfaces of different spectral characteristics as these may change the spectral energy distribution of the received signal.

Unfortunately, conventional systems are designed to discriminate images with respect to a fixed spectral energy ratio. As a result, conventional systems are limited with respect to the variety of unwanted images which may be canceled.

Thus, there is a need in the art for a system which automatically enhances the ability of a system to discriminate between sources that can not be removed by a fixed cancellation scheme.

SUMMARY OF THE INVENTION

The need in the art is addressed by the present invention which provides an image discriminator which automatically enhances the ability of a system to discriminate between sources that can not be removed by fixed cancellation. The invention includes a mechanism for separating input energy into first and second frequency bands and providing first and second signals corresponding thereto. The ratio of the amplitudes of the first and second signals are varied and subtracted from each other to provide a servo control signal. The first and second signals are also used to control the gain ratio. Third and fourth signals are extracted from the first and second signals. The third and fourth signals represent energy from non-tracked objects. Circuitry is provided for varying the ratio of the amplitudes of the third signal and the fourth signal in at least two trials. The amplitude ratio varied third signal is subtracted from the amplitude ratio varied fourth signal for each respective trial to provide fifth and sixth signals respectively. The fifth and sixth signals are analyzed and used to adjust the ratio of the gain of the first and second signals in response thereto.

In a specific embodiment, the ratio of the amplitudes of the first and second signals are varied and subtracted from each other to provide signal waveforms representing encoded target positions relative to the lens or system iris. These waveforms are decoded to provide a lens servo control signal from tracker circuits. The signals are also used to control the gain ratio for controlling the relative amplitude of the first and second signals so that unwanted objects are canceled in the subtraction process and will not be tracked.

Thus, the present invention provides an image discriminator which automatically enhances the ability of a system to discriminate between sources that can not be removed by fixed cancellation.

DESCRIPTION OF THE INVENTION

Illustrative embodiments and exemplary applications will now be described with reference to the accompanying drawings to disclose the advantageous teachings of the present invention.

Figure 1:
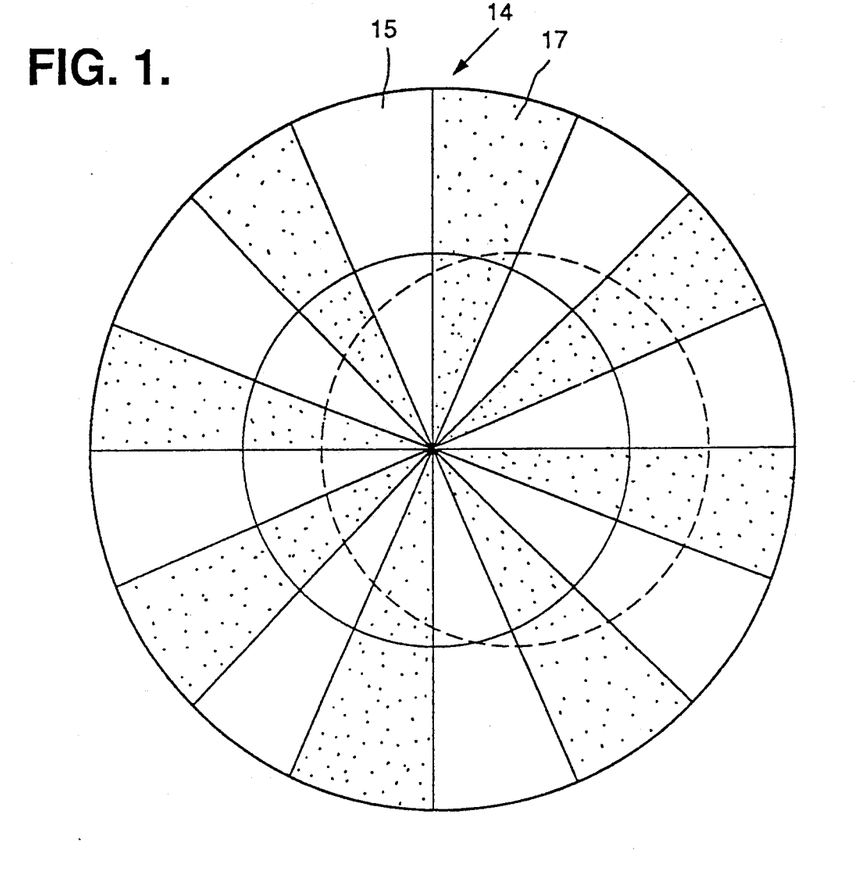
FIG. 1 is an illustrative schematic diagram of a conventional wagon wheel reticle.

Typically, image nutation moves the input image so that all points move in equal, in-phase circles on the reticle. As shown in FIG. 1, the centered circle represents a point source at the track null, where it produces a constant carrier signal by passing sequentially across the equal width opaque and transparent areas on the reticle. The offset circle represents a competing image (from a non-tracked target) displaced from the target null. Since it crosses wide and narrow parts of the spokes, the competing image produces a frequency modulation of the carrier. The range of the frequency excursion represents the radial distance from the track null and the phase of the modulation envelope gives the direction of the displacement.

If the offset circle is an unwanted signal, it can be processed separately from the wanted signal, at the track null, by examining frequencies away from the carrier signal. If the wanted signal is at the track null, it should have no energy content at the frequency extremes of the unwanted signal. These frequency regions are thereby available for separate processing to remove the unwanted signal.

The wanted and unwanted signals should have a different ratio of signal in the two wavelength regions. The removal of the unwanted signal is obtained by making detector response to the unwanted signal equal in the two wavelength bands. It is then removed by subtraction of the signals from the two detectors. Trial signal levels are used to adjust the ratio to give the null. This is readily accomplished by using three different gain ratios, the center ratio for the track output and the other two (higher and lower) ratios for holding the center ratio at the desired null for the non-tracked (unwanted) objects. The two non-nulled short wavelength signals are compared in the region of the signal separation with the long wavelength channel signal (using identical frequency separation filter circuits, for all signals to be compared) as a test of cancellation. The one ratio that is over-corrected will usually yield opposite polarity (or phase) from the under-corrected signal. The output signals from the under-corrected and over-corrected trial gains can be equalized in a closed loop system using a predicted correction based on the under-corrected signal levels or sum signal levels and the accuracy of the balance of under and over corrections as a percentage of their absolute value sums.

Figure 2A:
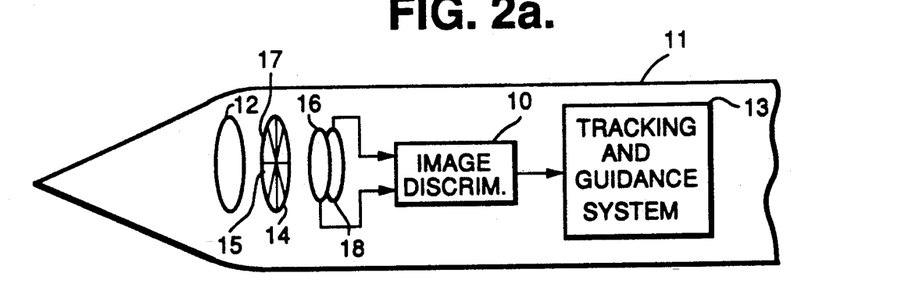
FIG. 2a illustrates a typical application for the image discriminator of the present invention.

The invention is adapted for use with any device that requires optical image discrimination. FIG. 2a, illustrates a typical application in which the image discriminator 10 of the present invention is mounted in the nose cone of a missile 11. Input imagery is focused by a lens 12 of conventional design on a wagon wheel reticle 14. The reticle 14 has alternating areas 15 and 17 of material, transparent and opaque, respectively, to optical energy at the wavelengths of interest. (See FIG. 1.) Two optical detectors 16 and 18 are positioned behind the reticle 14. In the preferred embodiment, the first detector 16 is a short wavelength detector and the second detector 18 is a long wavelength detector. The detector outputs are received and processed by the image discriminator 10 which provides signals corresponding to discriminated image sources to a conventional missile tracking and guidance system 13.

Figure 2B:
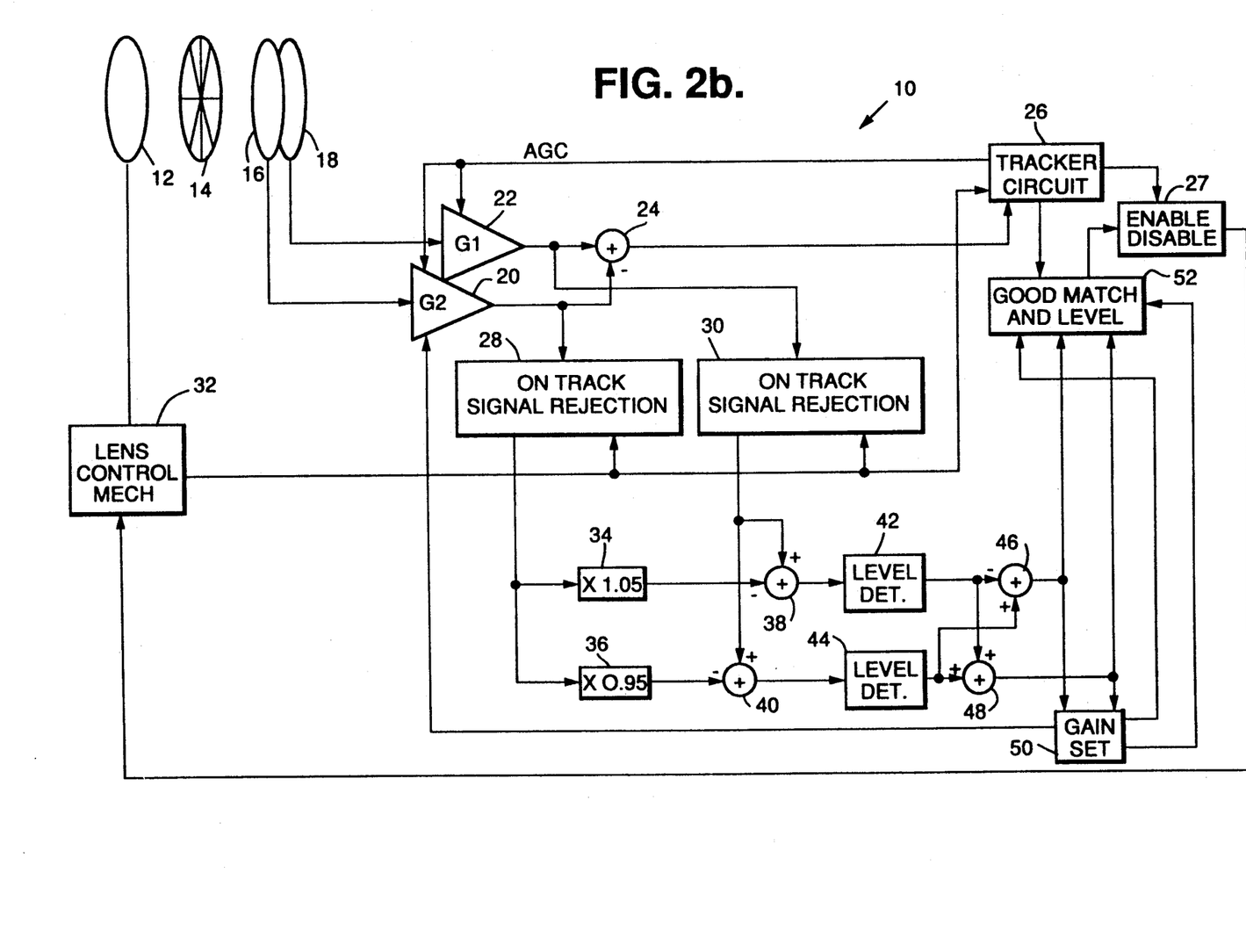
FIG. 2b is an illustrative embodiment of the image discriminator of the present invention.

FIG. 2b is a block diagram of an illustrative embodiment of the image discriminator 10 of the present invention. The short and long wavelength detectors 16 and 18 provide first and second electrical output signals corresponding to the amount of input energy in the high and low frequency bands respectively. The lens 12, reticle 14, and short and long wavelength detectors 16 and 18 may be of conventional design. The lens 12, reticle 14, and short and long wavelength detectors 16 and 18 comprise a mechanism for separating input energy into first and second frequency bands and providing first and second signals corresponding thereto.

The ratio of the amplitudes of the first and second signals are varied by first and second variable gain amplifiers 20 and 22 and subtracted from each other by a subtractor 24 to provide a signal which contains data representing target position. This signal is input to a tracker circuit 26.

Figure 3:
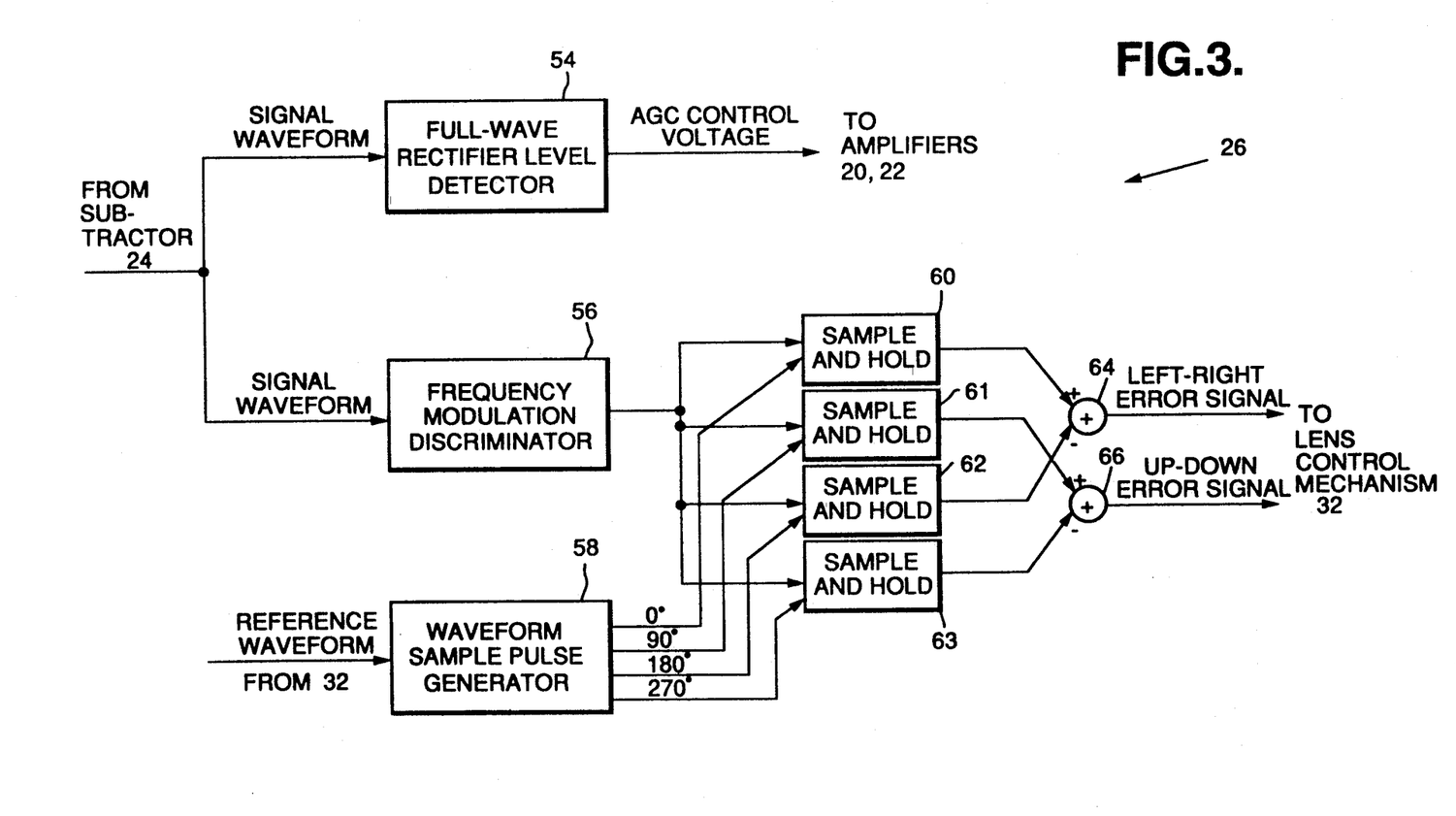
FIG. 3 is a block diagram of an illustrative implementation of the tracker circuit utilized in the present invention.

An illustrative implementation of the tracker circuit 26 is shown in FIG. 3. The tracker circuit 26 includes a full wave rectifier level detector 54 and a frequency modulation discriminator 56. The full wave rectifier level detector 54 and the frequency modulation discriminator 56 receive a first signal from the subtractor 24. The full wave rectifier level detector 54 maintains the amplitude of the signals from the two amplifiers by looking at the sum signal which contains the desired tracked signal. The full wave rectifier level detector 54 provides an automatic gain control (AGC) output to the first and second amplifiers 20 and 22. AGC is likely to be needed for simple two-color systems, for unless signals are differenced in the detector itself, amplifier dynamic range may not be sufficient to keep signals in their linear range under all conditions. Accurate AGC will be assumed by the low level detection circuitry discussed below. Low signal levels would result in slower or no correction, but higher signals levels could cause instability in compensation by putting even low signals above threshold in the detection circuits 42 and 44.

The frequency modulation discriminator 56 provides an output representative of the position of the tracked objects within the track field to a plurality of sample and hold circuits 60-63. The frequency modulation discriminator 56 produces an approximate sine wave output as the target image traverses the reticle 14. As the target image moves off-center on the reticle 14 the amplitude of the sine wave output increases. By sampling the sinusoidal output of the frequency modulation discriminator 56 as a function of the position of the lens 32, the position of the image may be determined.

This is accomplished by the provision of a reference waveform from the lens 32 indicating the position thereof to a waveform sample pulse generator 58. The reference waveform from the lens control mechanism 32 is sampled in quadrature by the waveform sample pulse generator 58 which provides a plurality of enable signals to the sample and hold circuits 60-63. That is, the waveform pulse generator 58 outputs a signal for a 0°, 90°, 180° and 270° positions of the lens 32 to the first, second, third and fourth sample and hold circuits 60, 61, 62 and 63 respectively. Thus, the sample and hold circuits 60-63 hold signals from the frequency modulation discriminator 56 corresponding, in the illustrative embodiment, to 0°, 90°, 180° and 270° positions of the lens 32. The outputs from the first and third sample and hold circuits 60 and 62 are subtracted by a first subtractor 64 to yield a left-right error signal and the outputs from the second and fourth sample and hold circuits 61 and 63 are subtracted by a second subtractor 66 to provide an up-down error signal. These pointing control signals are provided to the lens control mechanism 32 to move the lens to center the target in a conventional manner.

As illustrated in FIG. 2b and in accordance with the present teachings, first and second on-track signal rejection circuits 28 and 30 are provided. The first and second on-track signal rejection circuits 28 and 30 are connected to the outputs of the first and second variable gain amplifiers 20 and 22 respectively.

Figure 4:
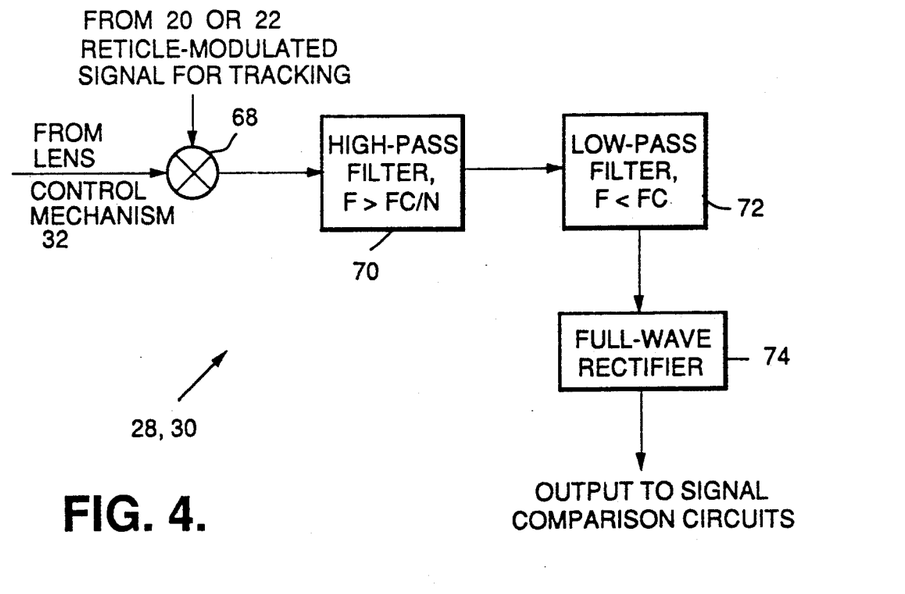
FIG. 4 is a block diagram of the on-track signal rejection circuit utilized in the present invention.

FIG. 4 is a block diagram of an on-track signal rejection circuit 28, 30 utilized in the present invention. The circuit 28, 30 includes a mixer 68, a high pass filter 70, a low pass filter 72 and a full-wave rectifier 74. The mixer 68 multiplies the reticle-modulated tracking signal from a corresponding amplifier 20 or 22 with a reference waveform from the lens control mechanism 32. (Note that this is not the same waveform used for tracking. That waveform is at frequency $F_N$.) The reference signal has a phase equal to the phase of the centered target and a carrier frequency $F_C$. The output of the mixer 68 is the downconverted carrier plus the tracked signal and other FM signals at nearby frequencies. The output of the mixer 68 is input to the high pass filter 70.

The high pass filter 70 passes modulated carrier sidebands and removes unmodulated carrier (DC) terms. The value $F_C/N$ for the high pass filter cutoff frequency is chosen to exclude a small region of track signals near null. Such frequencies near $F_C$ arise from errors or disturbances to track or from objects near the object being tracked. The smaller the departure of the original frequency from $F_C$ allowed, the closer the unwanted objects could be to the wanted object and yet be separated electronically. $F_C = S*F_N$, where $F_N$ is the nutation (scan) frequency and S is the number of opaque or transparent spokes. A value (in $F_C/N$) of N=10 or 20 is reasonable where N is arrived at empirically by operating the system in test conditions. The low pass filter must pass harmonics of the waveform, spaced by $F_N$, up to the carrier frequency harmonics, which are spaced by the carrier frequency FC.

The output of the high pass filter 70 is input to the low pass filter 72. The low pass filter 72 passes signals of a frequency lower than the cutoff frequency $F_C$. The low pass filter 72 removes harmonics of the carrier and other unwanted signal components. The output of the low pass filter is input to the full wave rectifier 74. The full wave rectifier 74 converts modulated signals to DC voltage signals. Thus, the first and second on-track signal rejection circuits 28 and 30 extract third and fourth signals from the first and second signals which represent energy from non-tracked objects.

The on-track signal rejection circuits 28 also receives an input, the reference waveform, from a lens control mechanism 32. The lens control mechanism 32 is a conventional servo-control circuit which moves the lens 12 to cause the input image to move on the reticle 14 in a conventional manner. The signal representing the track null is synchronously detected and removed (or otherwise removed, as by a notch filter), leaving a signal which represents a part of the waveform from non-nulled objects. For the wagon wheel reticle, the matching square-wave (carrier frequency) reference signal, with amplitude 1 and −1, and with a phase match relative to the null waveform, is multiplied by the (zero mean) output sensor waveform indicated, i.e., each color separately. The result is rectification of the null signal, with no signal remaining at the null (carrier) frequency. After DC restoration to zero mean, the output waveform contains virtually none of the null signal but has converted the null signal to the harmonics thereof, including the DC term just removed. Signals relating to frequency or phase excursions of the waveform are present at frequencies given by harmonics of the nutation frequency, as well as frequencies reached by time variations of input signals. These frequencies are those produced by the unwanted sources. By low-pass filtering to exclude harmonics of the carrier (reference or null) waveform, even its harmonics are eliminated. The function of the reference waveform in removing signal could also be performed by a notch filter at the carrier (null) frequency. However, synchronous detection is immune to shift of scan frequency and avoids the need for careful tailoring of notch shape to establish a particular response to near-null signals. Scanned array (imaging) sensors would use synchronous detection signals, usually digitally generated, which are also related to or essential for track reference functions, to gate out the target and its immediate surroundings in the image; thus, only non-target signals would be passed. Moreover, a larger gate around this gated target region could restrict consideration of unwanted targets to areas adjacent to the target where their main effects in stealing track would be seen.

As illustrated in FIG. 2b, the output of the first on-track signal rejection circuit 28 is connected to first and second trial gain adjustment circuits 34 and 36. The first trial gain adjustment circuit 34 provides an output signal 5% (for example) greater than the input thereto while the second trial gain adjustment 36 provides an output signal 5% less than the input thereto. The first and second trial gain adjustment circuits 34 and 36 provide trial gains which are subtracted from the non-tracked signal (provided by the second on-track signal rejection circuit 30) by second and third subtractors 38 and 40 respectively. The output is intended to be signal levels of the unwanted signal at two different relative (color) gains. For a two-color imaging sensor, the range of color difference signals in the gated region of unwanted signals would be developed at two different differential signal gains.

The trial gains are analyzed to determine if a gain change is needed and to provide an estimate of the change. The outputs of the second and third subtractors 38 and 40 are input to first and second level detection circuits 42 and 44 respectively. The level detection circuits are simple full-wave rectification circuits for the wagon wheel reticle or for many other reticle trackers. This will indicate the magnitude of the unwanted signal at the two trial gains. Summing the two trial gains provides the level for a simulated error of 0.1 of the short wavelength signal; differencing provides an estimate of the gain correction needed. Thus, the outputs of the first and second level detection circuits 42 and 44 are subtracted in a fourth subtractor 46 and added in an adder 48. The output of the fourth subtractor 46 and the adder 48 are provided to a gain setting circuit 50 and a good match and level detection circuit 52.

Figure 5:
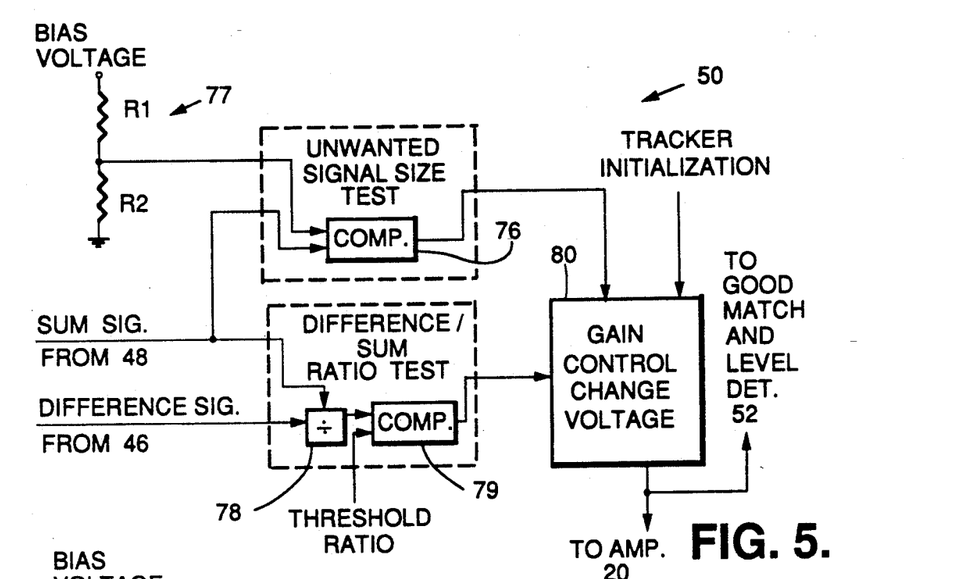
FIG. 5 is a block diagram of an illustrative embodiment of the gain setting circuit utilized in the present invention.

A significant feature of the present invention is the gain setting circuit 50 which automatically adjusts the gain of one of the variable gain amplifier circuits 20 to affect the gain ratio in accordance with the outputs of the fourth subtractor 46 and the adder 48. FIG. 5 is a block diagram of an illustrative embodiment of the gain setting circuit 50 utilized in the present invention. The gain setting circuit 50 includes a first comparator 76. The first comparator 76 performs an unwanted signal size test by comparing the sum signal from the adder 48 to a sum signal threshold. The sum signal threshold is provided by a first voltage divider 77, for example, including first and second resistors R1 and R2.

A divider 78 and a second comparator 79 provide a difference/sum ratio test. The difference signal from the subtractor 46 is divided by the sum signal from the adder 48 to provide a difference/sum ratio. The difference/sum ratio is compared to a threshold ratio provided by a source (not shown) by the second comparator 79.

If the sum signal is greater than or equal to the threshold a change is enabled via a gain control voltage change circuit 80. Likewise, if the ratio is greater than or equal to the threshold ratio, a gain control change voltage is again enabled. The gain control change voltage circuit 80 provides a gain control signal to the second amplifier 20 and to the good match and level detector 52. The gain control change voltage circuit 80 is a gated scaling circuit for providing an appropriate change control voltage level for the amplifier 20.

The gain set will be somewhat empirical in that threshold and activation elements, as well as an estimate reduction factor determined for the particular conditions expected, will be included. Activation can stem from the tracker circuits since cooperation between the tracker circuits and the level detection circuits in determining good match and stable track may be necessary to prevent shift to track of an unwanted object when such object first appears. Large difference in the levels for the trial gains would imply a significant, uncanceled unwanted object and would suggest track of prior position and rate until cancellation can be achieved. Cancellation should not be attempted on small differences, as drift of the cancellation to the color of background objects that are no problem might occur. Setting the minimum level enabling response (a threshold) prevents drift of the cancellation to the color of background objects. Operation of the AGC on the object being tracked provides scaling of all objects to its signal level.

Figure 6:
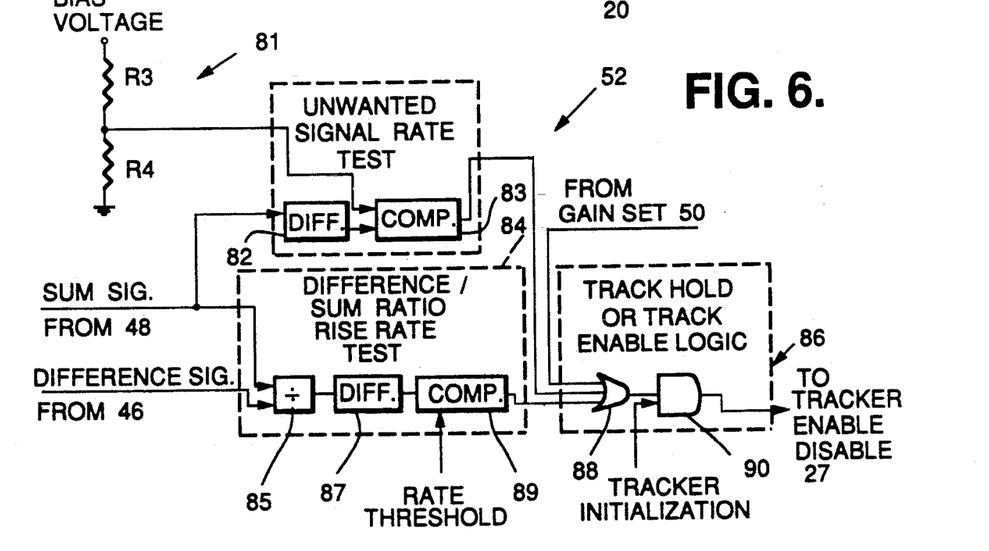
FIG. 6 is a block diagram of an illustrative embodiment of the good match and level detection circuit utilized in the present invention.

The good match and level detection circuit 52 is not essential to the primary function of balancing out of unwanted signals but provides aid to the tracker. FIG. 6 is a block diagram of an illustrative embodiment of the good match and level detection circuit utilized in the present invention. An unwanted signal rate test is performed by a differentiator 82 and a third comparator 83. The sum signal from the adder 48 is differentiated by the differentiator 82 and input to the third comparator 83. A second input to the comparator 83 is provided by a second voltage divider 81. The second voltage divider 81 includes third and fourth resistors R3 and R4 and provides a sum rate threshold signal. The output of the comparator 83 is input to a track hold or track enable circuit 86.

A second input to the track hold or enable circuit 86 is provided from the gain setting circuit 50. A third input is provided by a difference/sum rise rate test circuit 84 including a divider 85, a differentiator 87 and a fourth comparator 89. The divider 85 divides the difference signal from the subtractor 46 by the sum signal from the adder 48. The resulting ratio is differentiated to determine the rate thereof by the differentiator 87. The differentiated signal is compared to a rate threshold by the comparator 89. The rate threshold signal is provided by a source not shown. The output of the fourth comparator 89 is a third input to the track hold or enable circuit 86. Track hold zeros the error signal and track enable passes the error signal on to the lens control mechanism 32.

The track hold or track enable circuit 86 is implemented with logic which determines whether the signal should be tracked or ignored. In the illustrative embodiment shown, the circuit 86 is implemented with a three input OR gate 88 which receives input from the third and fourth comparators 84 and 89 and from the gain set circuit 50. The output of the OR gate 88 is "ANDed" with a by a tracker initialization signal by an AND gate 90. The tracker initialization signal is provided to the circuits 50 and 86 to time the activation thereof. This prevents action of the cancellation circuits on the wanted object before it is brought to center.

The output of the tracker hold or enable circuit 86 is provided to a tracker enable or disable circuit 27 in FIG. 2b. The tracker enable or disable circuit 27 is a gate which controls the application of tracker output signals to the lens control mechanism 32.

In operation, infrared or other radiation is modulated by the reticle 14 (or other means) which produces flux variations indicative of the position of the target and other objects. The flux variations are also possibly indicative of differences for different spectral distributions of the viewed elements, as by a two-color reticle. These different objects with different spectral distributions, in general, give rise to different electrical signals on the two detectors 16 and 18. These electrical signals are sent to the gain tracking amplifiers 20 and 22 where the signals are amplified separately with a differential gain correction applied to balance out unwanted signals. A difference signal is created in the subtractor 24 in which the unwanted objects are canceled by having the same signal in both detector channels. The target signal is passed to the tracker circuits 26 in which basic tracking functions are performed. The good match circuit 52 tells the tracker 26 if the unwanted signals have been canceled. If not, the tracker does not respond to the offset signals.

In the on-track signal rejection circuits 28 and 30, the on-track signal characteristic, such as a discrete frequency or pulse train, is used to separate out the wanted signals from the non-tracked objects. These signals are test-balanced between the two bands using both a higher and a lower relative gain for the short wavelength channel. The outputs of the differences are sent to level detection circuits. In the level detection circuits, the signals are full-wave rectified or otherwise detected and compared for signal level and signal difference. These signals are then used by the good-match detector and for the differential gain adjustment in the amplifiers 20 and 22. At match, the difference value is small compared to the sum value. When match is being sought, the sum and difference values can be used to interpolate, changing the gain of the first amplifier 20 by $0.1 \times$ difference/sum. Many variations in the implementation details are possible. For example, it is possible to reverse the roles of the short and long wavelengths.

Thus, the present invention provides an image discriminator which automatically enhances the ability of a system to discriminate between sources that can not be removed by fixed spectral cancellation.

The present invention has been described herein with reference to a particular embodiment for a particular application. Those having ordinary skill in the art and access to the present teachings will recognize additional modifications, applications and embodiments within the scope thereof. For example, the invention can be applied to other tracker processes. That is, a rosette scan seeker may be used. This seeker does not use a reticle but instead scans the detector about the field of view in a rosette pattern. In this case, track is represented by a pulse train of target crossings at a particular scan phase. Instead of a filter to separate signals, timing is employed. The filters are replaced by gates that exclude the track point time from the output. Gates can also be set to exclude points well beyond the track point thus not allowing adaption to untracked objects that are too far from the null to compete. As for the imaging seeker, a second gate can be used to exclude the region well separated from the track point.

Modulation can be provided by the motion of the image relative to a reticle or relative to a pattern of detectors or a single detector. For the latter, a more complex motion than image nutation is generally employed, usually double-frequency rotation of offset axes, producing a rosette scan, or a combined nutation and rotation. Double motion scan, generating a variable sweep direction, is also employed with involute reticles to generate pure frequency modulation from uniform-width spokes. While the involute reticle, with uniform width spokes coming from a central hub along involute curves, as traced by unwinding a knotted cord from the hub, generates frequency modulation like the wagon wheel reticle, the double-motion, spinning the reticle about its hub while sweeping the hub along a circle centered on the optical axis, is used to allow continuous, variable-direction scan with response restricted to a circle lying between the hub and the periphery of the reticle. Alternatively, simple motion of the reticle can be used. For simple rotation of a reticle, some circumferential difference in pattern, such as spokes curved differently or transmission modulation, is employed to indicate the vector direction of target displacement. Radial differences are created by varying width or number of spokes. Nutation of a reticle results in the same signal characteristics as nutation of a lens, the usually preferred embodiment.

The principle of the invention can also be applied to imaging infrared sensors with image processing to track the target. In this case, target track null constitutes a null location (position) on the focal plane array (FPA) or, for a scanned array, position and time, which are electronically identical to position for the staring FPA. In future systems, a synthetic (electronic) stabilization may be used; it will define its own inertial line of sight for track, independently of the means for generation of the image or exact location of the array.

In the case of the wagon wheel reticle example, the phase of image nutation could be represented by a square wave at the scan (nutation) frequency with a given phase relationship to the reticle pattern, e.g., transitioning from 0 to 1 at the top of the scan, where the tracked target transitions to the opaque region of the reticle. A second square wave, 90 degrees of scan delayed or advanced, is helpful to the tracker functions or resolving track error signals to orthogonal coordinates. From either or both of these reference signals, a square wave matching the nulled track signal (but possibly of opposite phase) can be created for use in the on-track signal rejection circuits. For all reticles, the frequency and phase of the signal waveform at the track null are predetermined and are not produced for any other target position. The method of using two detectors is intended to include the variant in which one detector sequentially detects different wavelengths, which can then be processed as described above.

Thus, the inventive principles of separating the desired target (wanted signal) from unwanted and adjusting the response in two or more spectral bands so that the unwanted signal is minimized can be applied to various types of trackers.

It should be noted that with respect to the gain controlling amplifiers, it is only necessary to be able to differentially control the amplitudes of the signals from the two different detectors (or, alternatively, the different detector wavelength responses). Also, for frequency modulation tracking systems the signals must be kept out of saturation so that differential signal have significance. A two color system implies avoidance of saturation in the separate signal channels so that differencing or other process can make use of relative response. Thus, this is only an additional requirement for differential signal control, where the uncontrolled differencing (or ratio selection) of prior schemes could combine signals at a lower level without the need for gain adjustment. In either case, frequency modulation systems in the tracker circuits would carry the signals to saturation after combining the signals, while other types of trackers might retain the amplitude information throughout.

Further, those skilled in the art will recognize a variety of means for providing fixed and variable thresholds for the circuits mentioned above.

It is therefore intended by the appended claims to cover any and all such applications, modifications and embodiments within the scope of the present invention.

Accordingly,

What is claimed is:

1. An image discriminator comprising:

first means for separating input energy into first and second frequency bands and providing first and second signals corresponding thereto;

second means for varying the ratio of the amplitudes of said first and second signals;

third means, connected to the output of said second means, for subtracting the amplitude ratio varied first signal from the amplitude ratio varied second signal to provide a control signal and for controlling said second means in response to the amplitude of said control signal;

fourth means, connected to the of said second means, for extracting from the amplitude ratio varied first and second signals third and fourth signals which represent energy from non-tracked objects;

fifth means for varying the ratio of the amplitudes of said third signal and said fourth signal in at least two trials and for subtracting said amplitude ratio varied third signal from said amplitude ratio varied fourth signal for each respective trial to provide fifth and sixth signals respectively; and sixth means for analyzing said fifth and sixth signals and adjusting the ratio of the gain of said first and second signals in response thereto.

2. The invention of claim 1 including means connected to said sixth means for indicating track quality.

3. The invention of claim 1 wherein said first means includes a lens.

4. The invention of claim 3 including a lens control mechanism connected between said third means and said lens.

5. The invention of claim 1 wherein said fourth means includes means for filtering said first and second signals to eliminate signals near a track null.

6. The invention of claim 1 wherein said first means includes first and second detectors for providing said first and second signals respectively.

7. The invention of claim 6 wherein said first means further includes an optical reticle.

8. The invention of claim 7 further including means for adjusting the position of an input image on said reticle.

9. The invention of claim 6 wherein said first detector is a short wavelength detector and said second detector is a long wavelength detector.

10. The invention of claim 6 wherein said second means includes first and second variable gain amplifiers for selectively amplifying said first and second signals respectively.

11. The invention of claim 10 wherein said third means includes tracker circuit means for varying the gain of said first and second variable gain amplifiers in response to the amplitude of said control signal.

12. The invention of claim 11 wherein said fourth means includes means for filtering said first and second signals to eliminate signals near a track null.

13. The invention of claim 12 wherein said fifth means further includes first and second subtractors each having a first input connected to a corresponding multiplier and a second input provided by said fourth means.

14. The invention of claim 13 wherein said sixth means includes first and second level detector circuits connected to said first and second subtractors respectively.

15. The invention of claim 14 wherein said sixth means further includes an adder circuit for adding the outputs of said first and second level detector circuits to provide a seventh signal and a subtractor circuit for subtracting the outputs of said level detectors circuits and providing an eighth signal.

16. The invention of claim 15 including means connected to said sixth means for indicating track quality based on said seventh and eighth signals.

17. The invention of claim 16 including means for varying the gain of said first and/or second variable gain amplifiers in response to said seventh and eighth signals.

18. An image discriminator for a missile guidance system comprising:

first means for separating input energy into first and second frequency bands and providing first and second signals corresponding thereto, said first means includes first and second detectors for providing said first and second signals respectively, an optical reticle and means for adjusting the position of an input image on said reticle, said first detector being a short wavelength detector and said second detector being a long wavelength detector;

second means for varying the ratio of the amplitudes of said first and second signals, said second means including first and second variable gain amplifiers for selectively amplifying said first and second signals respectively;

third means for subtracting the amplitude ratio varied first signal from the amplitude ratio varied second signal to provide a servo control signal and for controlling said second means in response to the amplitude of said servo control signal, said third means including tracker circuit means for varying the gain of said first and second variable gain amplifiers in response to the amplitude of said servo control signal;

fourth means for extracting from said first and second amplitude ratio varied signal and fourth signals which represent energy from non-tracked objects, said fourth means including means for filtering said first and second amplitude ratio varied signals to eliminate signals near a track null;

fifth means for varying the ratio of the amplitudes of said third signal and said fourth signal in at least two trials and for subtracting said amplitude ratio varied third signal from said amplitude ratio varied fourth signal for each respective trial to provide fifth and sixth signals respectively;

sixth means for analyzing said fifth and sixth signals and adjusting the ratio of the gain of said first and second signals in response thereto;

seventh means connected to said sixth means for indicating track quality; and eighth means for varying the gain of said first and/or second variable gain amplifiers in response to the output of said sixth means.

19. The invention of claim 18 wherein said fifth means includes first and second multipliers.

20. The invention of claim 19 wherein said fifth means further includes first and second subtractors each having a first input connected to a corresponding multiplier and a second input provided by said fourth means.

21. The invention of claim 20 wherein said sixth means includes first and second level detector circuits connected to said first and second subtractors respectively.

22. The invention of claim 21 wherein said sixth means further includes an adder circuit for adding the outputs of said first and second level detector circuits to provide a seventh signal and a subtractor circuit for subtracting the outputs of said level detectors circuits and providing an eighth signal.

23. The invention of claim 22 including means connected to said sixth means for indicating track quality based on said seventh and eighth signals.

24. A method for discriminating a first tracked image from a non-tracked image including the steps of:

a) separating input energy into first and second frequency bands and providing first and second signals corresponding thereto;

b) varying the ratio of the amplitudes of said first and second signals;

c) subtracting said the amplitude ratio varied first signal from said the amplitude ratio varied second signal to provide a control signal and for controlling said second means in response to the amplitude of said control signal;

d) extracting from the amplitude ration varied first and second signals third and fourth signals which represent energy from non-tracked objects;

e) varying the ratio of the amplitudes of said third signal and said fourth signal in at least two trials and for subtracting said amplitude ratio varied third signal from said amplitude ratio varied fourth signal for each respective trial to provide fifth and sixth signals respectively; and f) analyzing said fifth and sixth signals and adjusting the ratio of the gain of said first and second signals in response thereto.

* * * * *